(12) United States Patent
Brune et al.

(10) Patent No.: US 6,192,833 B1
(45) Date of Patent: Feb. 27, 2001

(54) PARTITIONED AQUACULTURE SYSTEM

(75) Inventors: David E. Brune; John A. Collier, both of Seneca; Thomas E. Schwedler, Clemson, all of SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 09/270,137

(22) Filed: Mar. 16, 1999

Related U.S. Application Data
(60) Provisional application No. 60/078,186, filed on Mar. 16, 1998.

(51) Int. Cl.[7] .................................................. A01K 61/00
(52) U.S. Cl. ............................................................ 119/204
(58) Field of Search ................................... 119/200, 204, 119/205, 234, 236, 215, 217, 226, 227

(56) References Cited

U.S. PATENT DOCUMENTS

| | | | |
|---|---|---|---|
| 3,763,824 | * 10/1973 | Schoon | 119/215 |
| 4,137,868 | * 2/1979 | Pryor | 119/215 |
| 5,176,100 | * 1/1993 | Fujino | 119/215 |
| 5,205,237 | * 4/1993 | Skeggs et al. | 119/215 |
| 5,353,745 | * 10/1994 | Fahs, II | 119/226 |
| 5,778,823 | * 7/1998 | Adey et al. | 119/215 |
| 5,820,759 | * 10/1998 | Stewart et al. | 210/602 |

OTHER PUBLICATIONS

Schwartz, et al.; "The Partitioned Aquaculture System: Oxygen Dynamics" Paper distributed at the World Aquaculture Society Meeting, Las Vegas, NV, 1998.

Meade, J.L., D.E. Brune, J.A. Collier, T.E. Schwedler, G. Schwartz, S.A. Davis, R.W. Starkey; "The Partitioned Aquaculture System: Algal and Nitrogen Dynamics" Paper distributed at the World Aquaculture Society Meeting, Las Vegas, NV, 1998.

D.E. Brune and Jaw–Kai Wang; "Recirculation In photosynthetic Aquaculture Systems"; pp. 63–71; Aquaculture Magazine May/Jun. 1998.

C.M. Drapcho and D.E. Brune; "Design of A Partitioned Aquaculture System"; Paper distributed at the International Winter Meeting of the American Society of Agriculture Engineers, New Orleans, LA, 1989.

* cited by examiner

Primary Examiner—Thomas Price
(74) Attorney, Agent, or Firm—Dority & Manning, P.A.

(57) ABSTRACT

The present invention generally relates to a process and system for raising aquatic organisms, such as shellfish, shrimp and fish. More particularly, the present invention is directed to an automated partitioned aquaculture system for raising catfish. The aquiculture system comprises an algal growth channel; at least one raceway for producing and maintaining the aquatic organisms; and a first and second flow control device. The first flow control device is configured to control the flowrate of water through the algal growth channel substantially independently of the flowrate of water in the raceway. By changing the water flowrate, in response to factors in the aquaculture environment, production of aquatic organisms can be substantially increased.

37 Claims, 3 Drawing Sheets

PARTITIONED AQUACULTURE SYSTEM

This application claims the benefit of U.S. Provisional Application No. 60/078,186 filed Mar. 16, 1998.

FIELD OF THE INVENTION

The present invention generally relates to a process and system for raising aquatic organisms, such as catfish and shellfish. More particularly, the present invention is directed to an automated partitioned aquaculture system for raising the aquatic organisms.

BACKGROUND OF THE INVENTION

Within the last thirty years, U.S. aquaculture production has grown from a farmgate value of around $100 million to nearly 500 million dollars. Pond production continues to dominate aquaculture production. Pond reared catfish account for nearly half of the total U.S. aquaculture production, with the majority of this production emerging from four states: Mississippi, Alabama, Arkansas, and Louisiana.

Within these same three decades pond culture practices have undergone major changes. The industry demand for water has been the driving and shaping force for pond aquaculture. Mississippi dominates pond fish culture because of the availability of large volumes of shallow groundwater in the Mississippi delta region. However, even in Mississippi, the availability of water and land suitable for pond aquaculture continues to diminish. As a result, the farmers have been under on-going pressure to intensify production. In the early days production was limited to the biomass that wind driven re-aeration could support. In the late 50's, Alabama's Auburn University was recommending catfish farms target harvests at around 1300 lbs/acre. In 1969, catfish production averaged 1100 lbs/acre with a total production of 44 million lbs with good managers achieving 1500 lb/acre. The 1997 production was projected at 520 million lbs on 164,000 acres of ponds for an average farm production of 3200 lbs/acre. Well managed farms are estimated to be producing 4000–5000 lb/acre. To achieve these increased carrying capacities, producers added first emergency aeration, then routine nightly aeration and in some cases of very high carrying capacities 24-hr aeration. One to two hp per acre aeration is now standard practice in the industry. Occasionally, farmers will report 7000–8000 lb/acre of production, with researchers sometimes achieving as high as 12,000 lb/acre. However, pond production in excess of 5000 lb/acre which corresponds to peak feed applications of 80–100 lb/acre, is not routinely successful. In particular, it has been difficult to maintain oxygen at sufficient levels to meet the above production rates. Further, even if oxygen needs are met at these levels, total ammonia concentrations from livestock waste often reach limiting or toxic levels.

In pond cultures, oxygen levels are maintained by the presence of Algae. Another problem experienced at high production rates are Algal "bloom and crashes". This situation tends to lead to a succession of algal species, in particular blue green algae, which can result in a undesirable "off flavor" produced by an unwanted algal population dominating the pond, causing the flesh of the fish to have an unacceptable taste and odor.

At present, the problem remains as to whether pond fish production can be increased to meet future demands. In a raceway, the fish carrying capacity is ultimately limited by the accumulation of toxic metabolites such as $NH_3$ and $CO_2$, distributed into the water flow. If the water is to be used for additional fish culture, then specific waste treatment processes must be added to the flow path to remove the limiting metabolites. In contrast, in pond culture, the pond is both the waste treatment process and culture containment. The basic treatment process of the pond is algal photosynthesis, while some effort has been made to eliminate algal growth to encourage other treatment processes such as nitrification or $NH_3$ volatilization, most successful pond culture practices continue to be tied to management of highly eutrophic "green water" systems. However, the algal growth observed in typical ponds receiving the typical maximum feed application rate of 80–100 lb/acre-day rarely exceeds sustained levels 1–3 gm C/m2-day. In contrast, high rate algal production ponds are routinely operated at sustained levels of 6–12 gm C/m2-day. Algal production systems are designed to maintain uniform water velocities throughout the culture volume. This ensures that no horizontal or vertical stratification occurs. Therefore 100% of the water column is utilized. In addition the algal cell population is maintained at a young cell age (1–2 days) either through direct harvesting of the algal biomass or by control of system hydraulic detention time.

These observations suggest that the pond treatment capacity and therefore fish carrying capacity can likely be increased by reconfiguring the pond to maintain a uniform velocity and mixing profile throughout the entire pond. An additional advantage of creating a velocity profile in the pond allows for the different processes occurring in the pond, fish culture, solid waste removal, algal harvest, gas exchange to be compartmentalize in a series processes subject to more control by the operator, and consequently more reliable and predictable.

To date, the development of pond aquaculture has paralleled developments in other fields of agriculture, a trend resulting in the need for increased productivity, less labor, more automation, more process control, with higher degree of reliability and consistency of production. The social and market forces driving these changes are likely to intensify. We can expect future pond aquaculture to move from "farming" the waters to true production systems in which manipulated "ecosystems" (the fish pond) are redesigned into a series of more controllable fish production and waste treatment processes. The major counter balancing force will be the need to constrain costs.

A pilot scale aquaculture system is disclosed in an article entitled: "Design of a Partitioned Aquaculture System" by Drapcho, et al. which was written for presentation at the 1989 International Winter Meeting of the American Society of Agricultural Engineers.

SUMMARY OF THE INVENTION

The present invention recognizes various foregoing disadvantages and others of prior art constructions and methods.

Accordingly, it is an object of the present invention to provide an improved partition aquaculture system for raising aquatic life, such as fish and shellfish.

These and other objects of the present invention are achieved by providing a partitioned aquaculture system that has been designed to facilitate the harvest of plant life, such as algae, and the removal of organism wastes, such as fish wastes. In this design, the aquatic organisms are contained in high density cages in a tank separated from a high rate algal culture basin. Inorganic nutrients can be added to the algal basin to achieve the desired carbon fixation rate. Low head circulators are used to mix the water in the algal tank. A continuous flow of oxygen and water from the algal basin can be pumped to where the aquatic organisms are held in order to supply the organisms with dissolved oxygen and to flush dissolved wastes from the system.

In one embodiment, a funnel arrangement can be attached to the bottom of the fish cages in order to collect solid wastes. Algae can be removed mechanically from the flow into the location where the aquatic organisms are held or by housing filter-feeding fish in the system. By isolating the aquatic organisms and filter-feeding fish in cages, better management and easier harvest of the organisms can be achieved. The system of the present invention is particularly well suited to raising catfish.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying Figures, in which.

Figure 1:
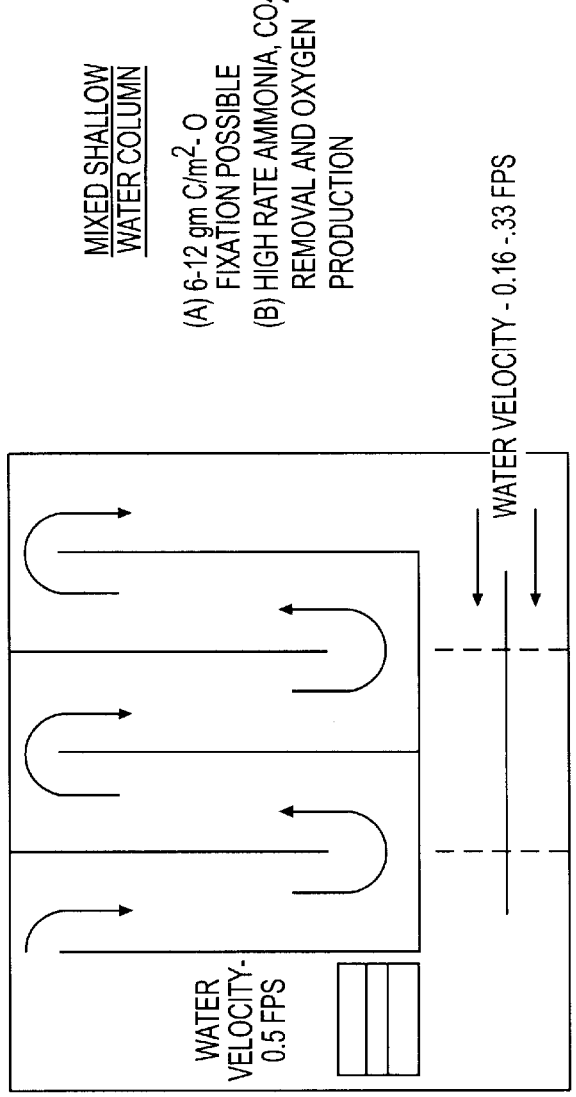
FIG. 1 is a diagrammatical view of a pilot scale partitioned aquaculture system made in accordance with the present invention.

Repeat use of reference characters in the present specification and drawings is intended to represent same or analogous features of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

In general, the present invention is directed to a partitioned aquaculture system for raising aquatic organisms, such as fish and shellfish. In particular, the system of the present invention is particularly well suited for raising catfish. Thus, much of the remaining description will be directed to a catfish embodiment. It should be understood, however, that the system is also well suited for raising other aquatic life forms.

The partitioned aquaculture system of the present invention can be completely automated for raising the aquatic organisms under ideal conditions. Of particular advantage, the aquaculture system of the present invention can automatically increase production rates without having to proportionally increase the water supply demand. The system is designed to regulate and control dissolved oxygen, the aquatic organism waste, which is typically ammonia and carbon dioxide, and is designed to continuously rejuvenate an algal population, which is primarily responsible for supplying the system with oxygen.

It has been discovered that one of the simplest and lowest cost techniques to increase aquaculture production efficiency is to crowd the aquatic animals into a confined space, column, tank or raceway, while connecting this raceway to the bulk pond with a low head, high volume, controllable water mover establishing a uniform pond water velocity. The entire pond/fish culture process once flow stabilized is subject to computer control and adjustment. By controlling the water velocity across the fish a more uniform water quality can be maintained for all fish. With the fish confined to raceways, fish predation can be eliminated, and fish feeding efficiency is improved since feed is not lost to the pond. Furthermore, the operator can more directly observe feeding behavior of the fish, and if necessary, chemical treatment of confined fish in smaller volume of water is easier and more economical. Labor requirements for harvesting, sorting and inventory of fish are significantly reduced.

By maintaining a uniform slow velocity in the pond, the photosynthetic capacity and therefore waste treatment capacity can be vastly improved. Water movement insures that 100% of the pond volume, surface area and depth are utilized.

The present inventors have demonstrated that current industry pond fish production of 5000 lb/acre can be increased to 14,000 lb/acre through the use of a new technique, referred to herein as The Partitioned Aquaculture System (PAS). The basic premise of the system is to physically separate the fish culture unit from the waste water treatment unit to facilitate better management of both fish production and waste removal and treatment (see FIG. 1). In the PAS design, the ponds are configured into a long narrow channel to allow for the maintenance of a uniform and controlled water velocity throughout the pond. This configuration has been used by sanitary engineers for wastewater treatment in a system referred to as an algal oxidation ditch. It also has been used for the high rate production of algal biomass. This system couples high density raceway culture of fish with paddle-wheel driven high rate algal growth basins for treatment of ammonia and organic wastes allowing 100% reuse of culture water in self-contained, self-oxygenating culture units. The water flow through the raceway and algal oxidation ditches is maintained with a low head paddle wheel circulation device operating at 1.5 to 3 rpm. In addition, a settling basin is located at the outlet of the raceways to capture and concentrate fish waste for removal from the system.

The PAS technology builds upon the largest and least expensive production technology in the U.S., earthern pond production, most typically used for channel catfish production. It incorporates and maximizes the best features of earthern ponds, while simultaneously reducing some of the problems of typical pond systems.

Since algal growth cannot be excluded from a fish pond, the PAS has been designed to optimize and control the algal growth. The action of the driving paddle wheel results in slow and constant mixing of the pond water, which ensures better distribution of nutrients and light in the water column. The primary advantage of this configuration is that the uniform mixing allows for efficient growth of algae in the pond. It also reduces the swings between algal blooms and crashes resulting from the algal population exceeding levels which can be supported by nutrient inputs from the fish feeding. Research to date, suggests that an additional increase of production to 20,000 lbs/acre may be possible by coupling the fish/algal system to co-culture of filter-feeding organisms such as tilapia (*Oreochromis niloticus*) and utilizing multiple stocking/harvestings per year.

The PAS concept offers several advantages over the existing culture technologies with regard to algal management. Since the filter feeding fish which consume the algae are held separately from the bulk pond water, there can be more control of the growth rate and productivity of the algal biomass. Thus far, algal photosynthesis has been stabilized at levels of 50 mg O2/liter-day net light bottle using tilapia co-culture resulting in constant chlorophyta algal densities of 15–20 cm secchi disk. Blue green algae have been excluded from the units as a result of the high algal grow rate and short algal cell age.

A second major advantage of controlling water velocity in the pond allows for control of the gas exchange rates in the pond. By decreasing the water velocity during the day and increasing the water velocity at night, it is possible to minimize oxygen loss from super-saturated levels as a result of algal photosynthesis during the daylight hours, and maximize re-aeration of the water column at night, which is necessary to compensate for algal respiration which occurs in darkness. One of the most important aspects of the PAS operation is that water velocities are computer controlled. The water quality is continuously monitored by electronic sensors. This information is, in turn, inputted to a series of computer algorithms which sends commands to the paddle wheel to change water speeds as required to optimize pond oxygen levels. Such fine management is not possible by human control. Furthermore, settleable solid wastes are collected in a sump, rather than being deposited in the pond. The collected solids become a concentrated source of phosphorus and nitrogen rich fertilizer for land crops. Therefore, the recirculating PAS does not require significant amounts of makeup water, beyond the normal volumes needed to meet evaporation and seepage losses, and produces no discharge to surface water.

Additional advantages are derived from confinement of the fish in a more manageable area so that the culturist can control the environment, accelerate growth rates, supplement oxygen levels, manage water quality, maximize feeding and improve feed conversion, treat disease and control parasites, eliminate bird predation, and manage fish size with grading, transfer, and harvest operations.

In typical pond aquaculture, only about 25% of the protein nitrogen in the feed ultimately becomes fish biomass. The remaining 75% of the nitrogen in fish feed is lost through denitrificaiton, seepage to groundwater, ammonia volatilization, or is discharged from the facility and becomes a pollutant in local surface or ground waters. Most aquaculture facilities are already facing limits on water use and discharge. The PAS approach offers the potential to significantly reduce these problems, provide increased yields, and increase nitrogen recovery through recycling of nutrients.

Figure 2:
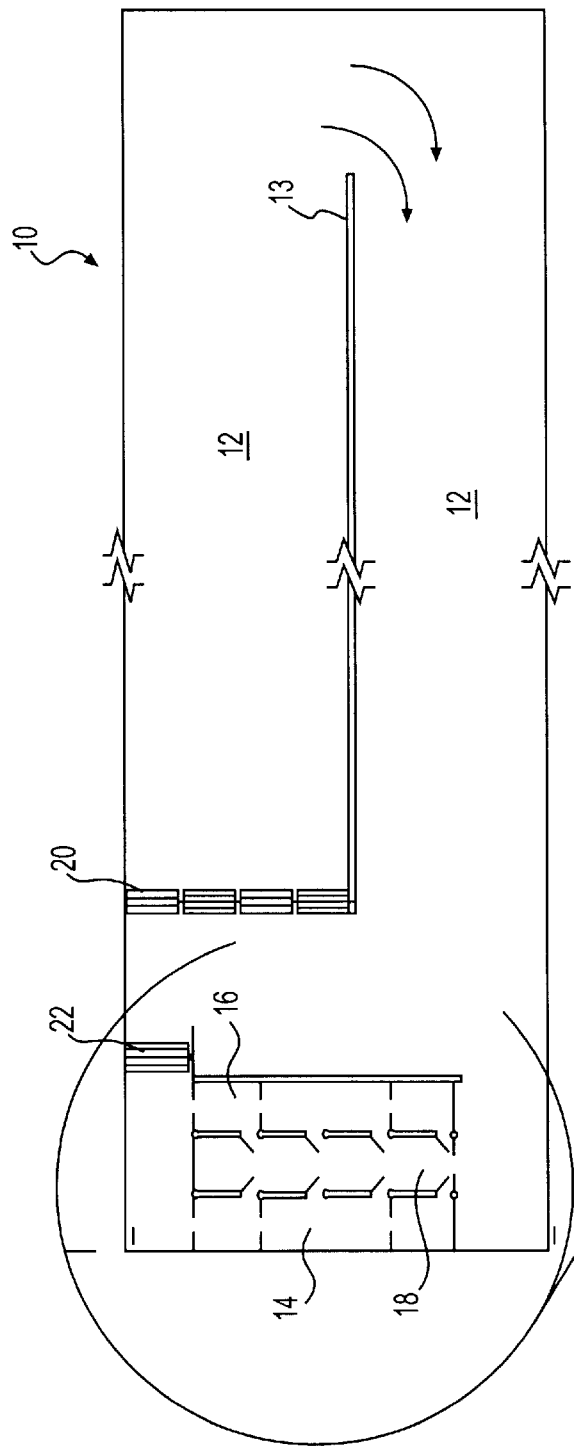
FIG. 2 is a diagrammatical view of one embodiment of a partitioned aquaculture system made in accordance with the present invention.
Figure 3:
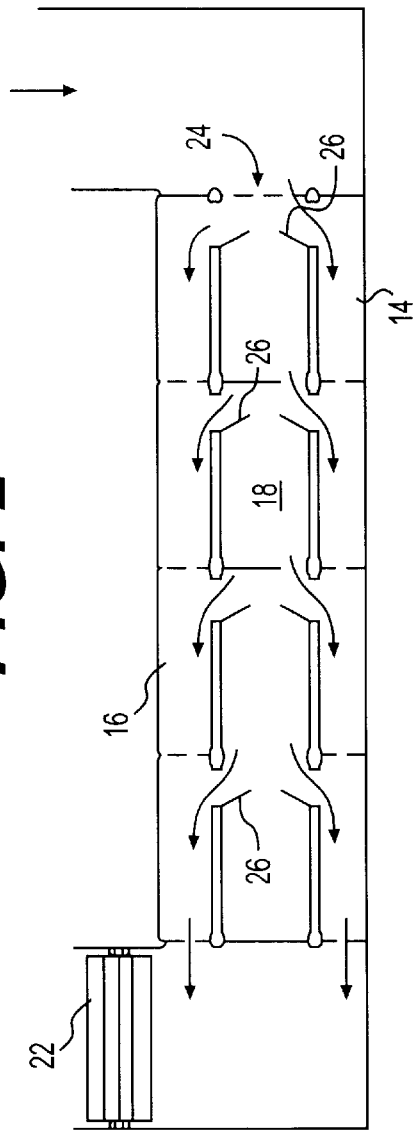
FIG. 3 is an enlarged diagrammatical view of a portion of the system illustrated in FIG. 2.

Referring to FIGS. 2 and 3, an alternative embodiment of a partitioned aquaculture system made in accordance with the present invention is illustrated. In particular, the embodiment illustrated in FIGS. 2 and 3 is believed to be better adapted for commercial applications than the embodiment illustrated in FIG. 1.

As shown, system 10 includes an algal growth channel 12 for maintaining an algal culture which produces oxygen and removes ammonia and carbon dioxide from the water. Algal growth channel 12 is U-shaped and contains a single dividing wall 13. As opposed to the embodiment illustrated in FIG. 1, algal growth channel 12 is relatively wide and contains only two segments as opposed to containing many segments. It is believed that by eliminating the number of segments, system 10 will be less expensive to operate than the system illustrated in FIG. 1. Further, the hydrodynamic characteristics of system 10 have been designed such that channel 12 can be made very wide and can include only one turn without adversely interfering with the algal culture that is grown and maintained within the channel.

As shown, algal growth channel 12 is in communication with a plurality of fish raceways which are better illustrated in FIG. 3. In particular, system 10 includes a middle raceway 18 surrounded by outer raceways 14 and 16. Outer raceways 14 and 16 are for maintaining the fish that are being produced. These fish are fed a high protein diet. Middle raceway 18, however, is for holding filter-feeding organisms, such as fish, which consume mature algae received from algal growth channel 12.

The algal biomass contained within growth channel 12 represents a stored oxygen demand, resulting in a net positive dissolved oxygen production. However, if the algae cells remain in the pond, a steady state population develops, and algal respiration or decay will consume the oxygen being produced. Therefore, net oxygen can be produced by photosynthesis only if the algae cells are harvested from the pond. In this regard, according to the present invention, algal consuming organisms are maintained within raceway 18 while the primary fish to be grown are maintained in raceways 14 and 16.

As shown particularly in FIG. 3, oxygen rich water produced in algal growth channel 12 is fed through raceways 14, 16 and 18 through a single raceway inlet 24 which feeds directly into raceway 18. Specifically, water from channel 12 is metered into middle raceway 18 where the water is then distributed into the outside raceways 14 and 16 by adjusting movable doors 26. In this arrangement, the water can be distributed throughout the raceways without producing an oxygen gradient. Further, the amount of oxygen fed to the fish in raceways 14 and 16 can be carefully controlled.

As shown, system 10 further includes a first flow control device 20 and a second flow control device 22. Flow control devices 20 and 22, which can be for instance paddle wheels, are designed to circulate water within system 10. Specifically, flow control device 20 is for controlling the velocity of water within algal growth channel 12, while flow control device 22 is for controlling the flow rate of water within raceways 14, 16 and 18.

Of particular advantage, flow control device 22 works independently of flow control device 20 for independently controlling the flow rate within the raceways. In this manner, adjustments can be made within the raceways without significantly affecting the conditions in algal growth channel 12 and vice versa. In this manner optimum conditions can be maintained for fish being produced and for the algae being grown.

In a preferred embodiment, flow control device 22, flow control device 20 and doors 26 are operated by a controller, such as a microprocessor, for automating the system. Specifically, system 10 can include numerous sensors for sensing oxygen concentration, the pH of the water, ammonia ($NH_4$) concentration, and/or temperature at one or more locations. For instance, the sensors can be contained in the system or samples from the system can fed to a centralized location and tested.

The controller can be in communication with each of the sensors for automatically monitoring system conditions. Based on the information received from the sensors, the controller can then automatically adjust flow rates as desired.

For instance, if it is determined that dissolved oxygen concentrations are too low, the controller can increase flow rates within algal growth channel 12 and raceways 14, 16 and 18 by adjusting flow control devices 20 and 22. By increasing the flow rate within channel 12, more oxygen will be introduced into the water. Also, by increasing flow rates through the raceways, more oxygen will be fed to the fish.

If, on the other hand, it is determined by the sensors that there is too much dissolved oxygen within the water, the controller can then decrease flow rates within channel 12 and within raceways 14, 16 and 18. In this manner, less oxygen will remain in the water and the fish being grown will receive lesser amounts of oxygen.

Figure 4:
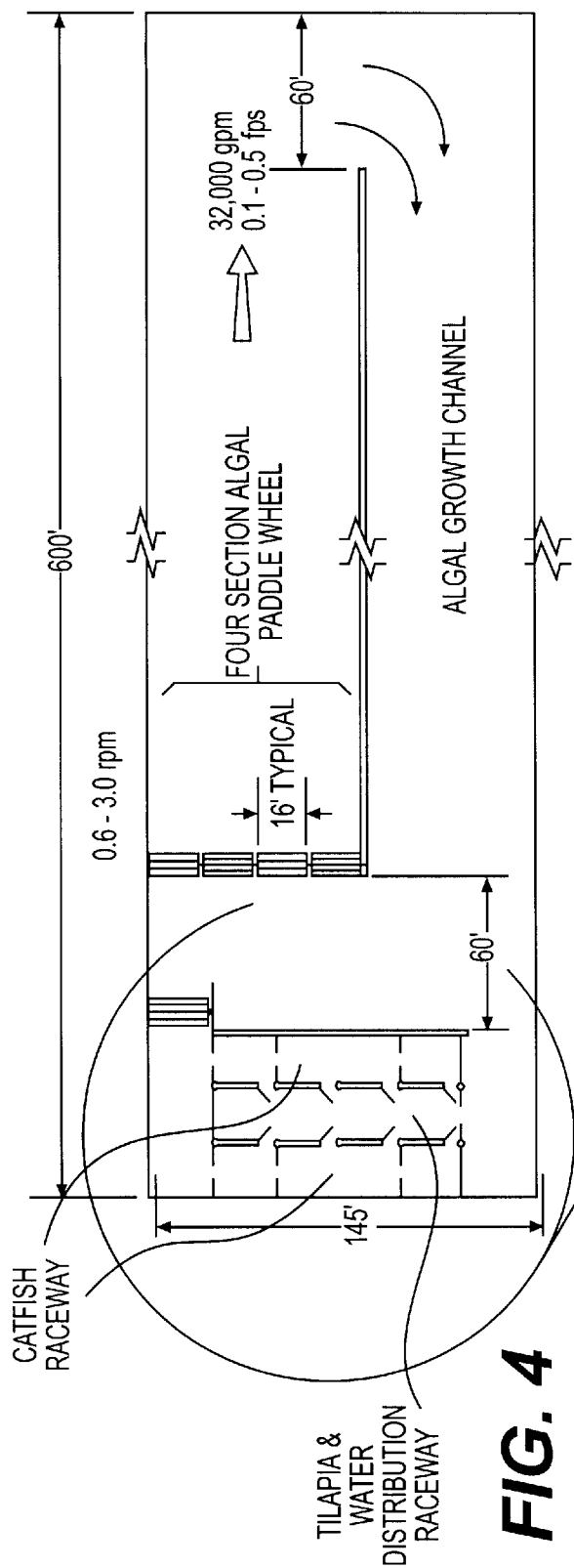
FIGS. 4 and 5 illustrate the partitioned aquaculture system shown in FIGS. 2 and 3, including exemplary flow rates and dimensions.
Figure 5:
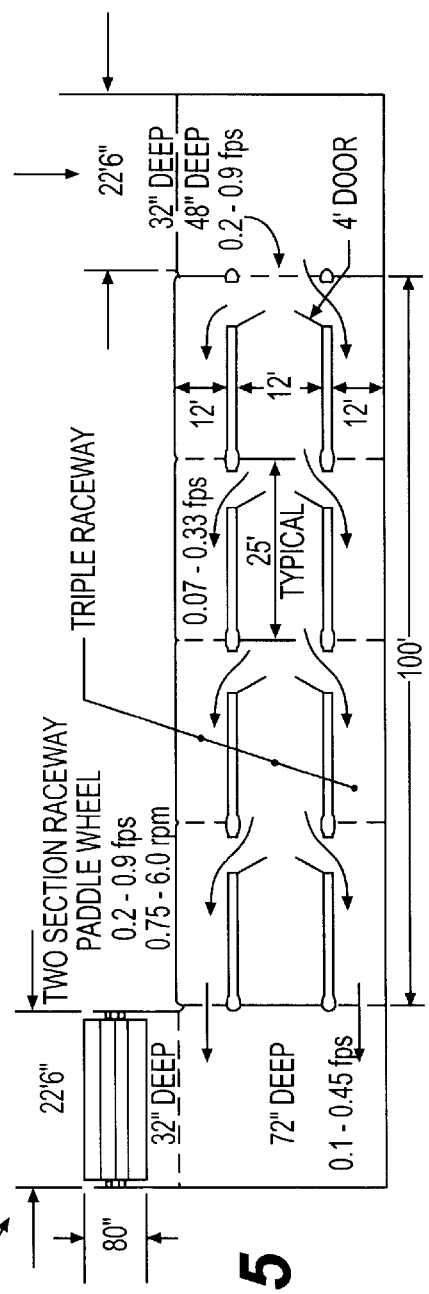

Referring to FIGS. 4 and 5, exemplary dimensions and flow rates for system 10 are shown. It should be understood, however, that these dimensions and flow rates represent merely one embodiment of the present invention.

As shown in FIGS. 4 and 5, the volumetric flow rate through the algal growth channel typically can be 32,000 gallons per minute (gpm), having a velocity of 0.1 to 0.5 foot per second (fps). The water in the algal growth channel is circulated by means of a controller. In one embodiment the controller may be a paddle wheel, with the speed of the paddle wheel being variable. For example, in FIG. 5, the speed of the paddle wheel may range from 0–6 to 3.0 rpm. However, it should be understood by one of skill in the art that the circulation time of the water in the algal growth channel will depend not only upon the speed at which the paddle wheel turns, but also upon the size of the individual paddles, among other factors.

It should be noted that the present invention also envisions a situation whereby the velocity of water circulating in the middle raceway differs from the velocity of water circulating in the outer and inner raceways. For example, FIG. 5 illustrates an embodiment of the present invention having a velocity from 0.1 to 0.45 fps in the outer and inner raceways, while the velocity in the middle raceway ranges from 0.07 to 0.033 fps. At the raceway inlet, the velocity ranges from 0.2 to 0.9 fps.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

We claim:

1. An aquaculture system for raising aquatic organisms comprising:
    an algal growth channel for circulating water and maintaining an algal growth population therein, said channel including a first flow control device for controlling the flowrate of water therethrough;
    at least one raceway located within said algal growth channel, said raceway in fluid communication with said algal growth channel at a raceway inlet, said raceway for producing and maintaining aquatic organisms, said raceway also preventing said aquatic organisms from entering the remainder of said algal growth channel, said raceway containing a second flow control device for controlling the flowrate of water therethrough, wherein the second flow control device is configured to control the flowrate of water through said raceway substantially independently of the flowrate of water in said algal growth channel.

2. The aquaculture system as in claim 1, further comprising at least one wall dividing said algal growth channel into a u-shaped segment.

3. The aquaculture system as in claim 1, wherein said flow control device for controlling the flowrate of water is a paddle wheel.

4. The aquaculture system as in claim 1, wherein said flow control device for controlling the flowrate of water is operated by a controller to automate said system.

5. The aquaculture system as in claim 4, wherein the controller is a microprocessor, said microprocessor being configured to gradually increase or decrease flow rates by controlling said first flow control and said second flow control.

6. The aquaculture system as in claim 5, wherein the controller further includes at least one monitoring sensor, said monitoring sensor sensing system conditions and communicating said system conditions to said microprocessor.

7. The aquaculture system as in claim 6, wherein said system conditions are selected from the group comprising pH, salinity, oxygen concentration, ammonia concentration, carbon dioxide concentration and temperature.

8. The aquaculture system as in claim 1, wherein said raceway comprises a plurality of raceways.

9. The aquaculture system as in claim 1, wherein said plurality of raceways comprises an outer raceway, an inner raceway, and a middle raceway positioned between said outer raceway and said inner raceway.

10. The aquaculture system as in claim 9, wherein said middle raceway only communicates with said algal growth channel through said raceway inlet, such that water entering from said algal growth channel enters said middle raceway, said middle raceway including a plurality of adjustable doors such that said middle raceway communicates with said inner raceway and said outer raceway therethrough.

11. The aquaculture system as in claim 1, wherein said aquatic organisms are selected from the group consisting of shellfish, shrimp and fish.

12. The aquaculture system as in claim 11, wherein said aquatic organisms are catfish.

13. The production of aquatic organisms in an aquaculture system, the aquaculture system comprising:
    an algal growth channel for circulating water and maintaining an algal growth population therein, said channel including a first flow control device for controlling the flowrate of water therethrough;
    at least one raceway located within said algal growth channel, said raceway in fluid communication with said algal growth channel at a raceway inlet, said raceway for producing and maintaining aquatic organisms, said raceway also preventing said aquatic organisms from entering the remainder of said algal growth channel, said raceway containing a second flow control device for controlling the flowrate of water therethrough, wherein the second flow control device is configured to control the flowrate of water through said raceway substantially independently of the flowrate of water in said algal growth channel; and a controller for controlling said first and second flow control devices.

14. The aquaculture system as in claim 13, further comprising at least one wall dividing said algal growth channel into a u-shaped segment.

15. The aquaculture system as in claim 13, wherein said flow control device for controlling the flowrate of water is a paddle wheel.

16. The aquaculture system as in claim 13, wherein the controller is a microprocessor, said microprocessor being configured to gradually increase or decrease flow rates by controlling said first flow control and said second flow control.

17. The aquaculture system as in claim 16, wherein the controller further includes at least one monitoring sensor, said monitoring sensor sensing system conditions and communicating said system conditions to said microprocessor.

18. The aquaculture system as in claim 17, wherein said system conditions are selected from the group comprising pH, salinity, oxygen concentration, ammonia concentration, carbon dioxide concentration and temperature.

19. The aquaculture system as in claim 13, wherein said raceway comprises a plurality of raceways.

20. The aquaculture system as in claim 13, wherein said plurality of raceways comprises an outer raceway, an inner raceway, and a middle raceway positioned between said outer raceway and said inner raceway.

21. The aquaculture system as in claim 20, wherein said middle raceway only communicates with said algal growth channel through said raceway inlet, such that water entering from said algal growth channel enters said middle raceway, said middle raceway including a plurality of adjustable doors such that said middle raceway communicates with said inner raceway and said outer raceway therethrough.

22. The aquaculture system as in claim 13, wherein said aquatic organisms are selected from the group consisting of shellfish, shrimp and fish.

23. The aquaculture system as in claim 22, wherein said aquatic organisms are catfish.

24. The method of producing aquatic organisms in an aquaculture system, the method comprising the steps of:

providing an aquaculture system including an algal growth channel in communication with a raceway, said raceway being located within said algal growth channel;

placing an aquatic organism in said raceway to be grown and harvested, said raceway preventing said aquatic organism from entering said algal growth channel;

placing algae in said algal growth channel to be grown and produce oxygen;

controlling a first flowrate through said algal growth channel and a second flowrate through said raceway so as to provide a suitable environment for producing and harvesting said aquatic organism in said raceway.

25. The method of producing aquatic organisms as in claim 24, further comprising providing said aquaculture system comprising at least one wall dividing said algal growth channel into a u-shaped segment.

26. The method of producing aquatic organisms as in claim 24, wherein said flow control device for controlling the first flowrate of water is a paddle wheel.

27. The method of producing aquatic organisms as in claim 24, wherein said first and second flowrates are controlled by a controller to automate said system.

28. The method of producing aquatic organisms as in claim 27, wherein said controller is a microprocessor, said microprocessor configured to gradually increase or decrease flow rates by controlling a first flow control device and a second flow control device.

29. The method of producing aquatic organisms as in claim 27, wherein said controller further includes at least one monitoring sensor, said monitoring sensor sensing system conditions and communicating said system conditions to said microprocessor, such that said microprocessor is operated.

30. The method of producing aquatic organisms as in claim 24, wherein said raceway further comprises a plurality of raceways, including an outer raceway, an inner raceway, and a middle raceway positioned between said outer raceway and said inner raceway, wherein said middle raceway only communicates with said algal growth channel through a raceway inlet, such that water entering from said algal growth channel enters said middle raceway, said middle raceway including a plurality of adjustable doors such that said middle raceway communicates with said inner raceway and said outer raceway therethrough.

31. The method of producing aquatic organisms as in claim 24, wherein said aquatic organisms are catfish.

32. The method of producing aquatic organisms as in claim 31, wherein said production of catfish is at least from about 5000 lb/acre to about 14,000 lb/acre.

33. The method of producing aquatic organisms as in claim 32, wherein said production of catfish is about 10,000 lb/acre.

34. The method of producing aquatic organisms as in claim 24, wherein an algal population in said algal growth channel is rejuvenated by regulation of an environment in said algal growth channel, said regulation regulating dissolved oxygen, ammonia concentration, carbon dioxide concentration, inorganic nutrient concentration and temperature.

35. The method of producing aquatic organisms as in claim 24, wherein an algal population is co-cultured with a filter feeding organism.

36. The method of producing aquatic organisms as in claim 35, wherein said filter feeding organism is tilapia (*Oreochromis niloticus*).

37. The method of producing aquatic organisms as in claim 24, wherein a settleable solid waste is collected in a sump and removed from said raceway.

* * * * *